United States Patent [19]
Johnstone

[11] 3,828,383
[45] Aug. 13, 1974

[54] CONTROL ASSEMBLY FOR ATTACHMENT TO A MACHINE TOOL TO CONTROL THREAD TAPPING OPERATIONS

[76] Inventor: Colin G. Johnstone, 38732 Puerta St., Palmdale, Calif. 93550

[22] Filed: Sept. 4, 1973

[21] Appl. No.: 394,128

[52] U.S. Cl. ................................. 10/136 E, 408/9
[51] Int. Cl. ............................................ B23g 1/18
[58] Field of Search ......... 10/129 R, 129 M, 136 R, 10/136 E, 136 TS, 139 R, 105; 408/9, 135, 136

[56] References Cited
UNITED STATES PATENTS

| | | | |
|---|---|---|---|
| 1,970,218 | 8/1934 | Bishop et al. | 408/9 |
| 1,991,927 | 2/1935 | Hermann et al. | 408/9 |
| 2,089,228 | 8/1937 | Schauer et al. | 408/9 |
| 2,189,422 | 2/1940 | Irwin | 408/9 |
| 2,345,318 | 3/1944 | Bakewell | 10/136 E |
| 3,008,155 | 11/1961 | Tsuda | 408/9 |
| 3,021,539 | 2/1962 | Uhtenwoldt | 408/9 |

Primary Examiner—Charles W. Lanham
Assistant Examiner—E. M. Combs
Attorney, Agent, or Firm—Forrest J. Lilly

[57] ABSTRACT

A control assembly for attachment to a machine tool such as a drill press or vertical miller, to control thread tapping operations. Such a machine tool typically includes a frame, a quill movable linearly on the frame supporting a motor driven spindle which turns a thread tap, and a control shaft for moving the quill. The control assembly includes an inner sleeve mounted on the control shaft and a concentric outer sleeve to which a control handle is connected. A lost motion connection enables the outer sleeve to move between opposite extreme positions relative to the inner sleeve and it is yieldably biased to an intermediate, neutral position. When the outer sleeve is at one extreme the motor is energized to drive the spindle in a direction causing the thread tap to feed into the workpiece. When it is at the other extreme, the motor turns the spindle in an opposite direction to feed the thread tap out from the workpiece. During other operations of the machine not involving thread tapping, the inner and outer sleeves can be locked together.

20 Claims, 8 Drawing Figures

PATENTED AUG 13 1974

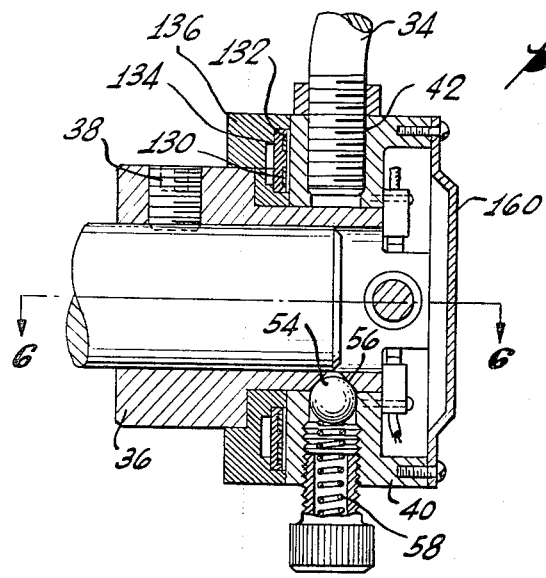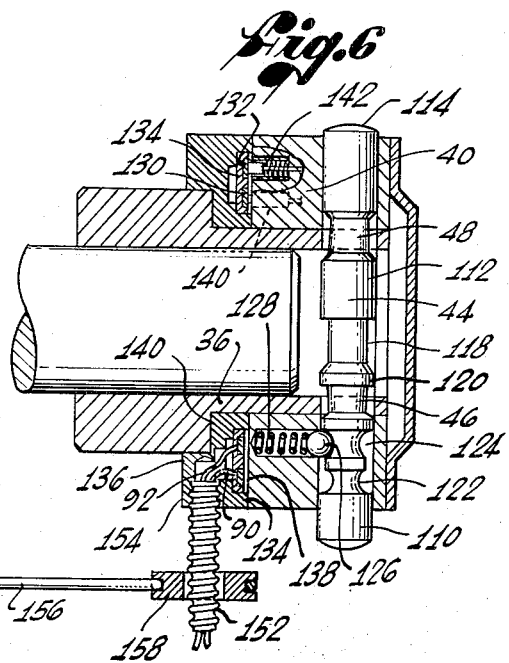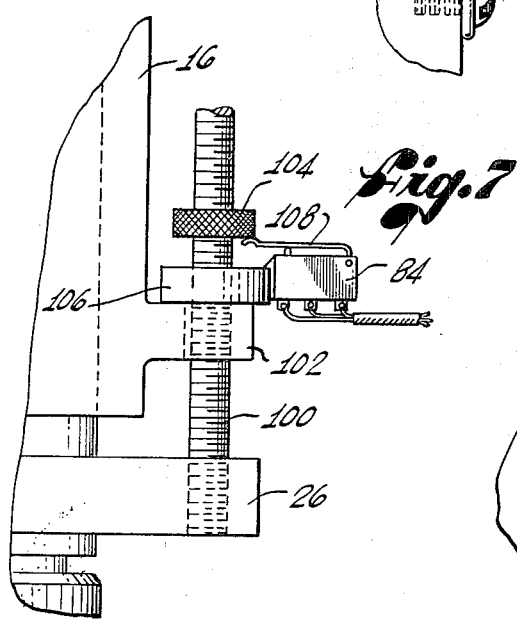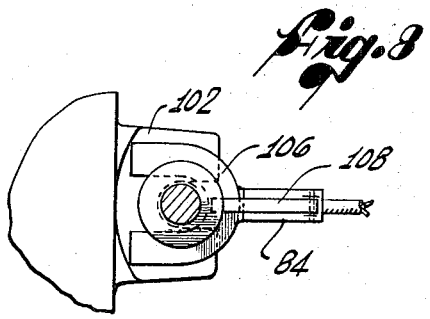

CONTROL ASSEMBLY FOR ATTACHMENT TO A MACHINE TOOL TO CONTROL THREAD TAPPING OPERATIONS

BACKGROUND OF THE INVENTION

This invention relates to a control assembly for attachment to a machine tool, such as a drill press or vertical miller, to effect control during thread tapping operations performed by the machine tool.

In tapping a thread in a workpiece, it is common to utilize a machine tool such as a drill press or vertical miller. Such a machine tool typically includes a frame, a quill connected to the frame for linear motion towards and away from the workpiece and a spindle rotatably mounted in the quill supporting a thread tap. A motor rotates the spindle in an appropriate in-feed direction during the tapping operation so that the tap cuts its way into an already bored hole in the workpiece and advances itself by a threading action. When the hole has been tapped to a desired distance, the direction of rotation of the tap is reversed and it unthreads, feeding itself outwardly of the workpiece. Movement of the quill to bring the tap into initial contact with the workpiece, is effected by a quill control shaft mounted in the frame having a rack and pinion connection to the quill, and a handle at its free end which an operator can grasp to advance the quill and the spindle towards the workpiece. Once tapping commences, the operator maintains sufficient down pressure on the handle to assist the progress of the tap into the hole.

To provide control over the direction and duration of motor operation during thread tapping, including reversal of rotation at the appropriate moment, various prior control assemblies have been devised. One prior device disclosed in U.S. Pat. No. 3,021,539 to Uhtenwoldt issued Feb. 20, 1962, includes an inner sleeve connected to the quill control shaft and an outer sleeve, to which the handle is connected, mounted on the inner sleeve. A lost motion connection between the sleeves provides a limited range of movement between them sufficient to enable a link connected with the outer sleeve to operate a control switch mounted on an adjacent part of the frame, between two positions. In one position of the control switch the motor is energized in a direction to advance the thread tap into the workpiece and in the other position of the switch the motor is energized to reverse the rotation of the thread tap so that it feeds out of the workpiece. When the operator wishes to terminate tapping operation, he moves the handle in a direction to elevate the quill thereby moving the outer sleeve through the limited range of lost motion which causes the control switch to be moved to its other position reversing the rotation of the tap.

Although satisfactory for its intended purpose, such prior device may not be suitable to meet the requirements of some machine operators for a number of reasons. For example, the prior device could not be attached to the machine tool existing machine merely by replacing the existing hub unit on the control shaft with a new unit containing the components of the tap control system and making the appropriate electrical connections. In addition to mounting the sleeves on the shaft it would be necessary to install an additional external component on the frame comprising the switch itself connected by exposed and vulnerable linkages to the sleeves. Such relative complication of installation might not be acceptable to some operators.

In addition, the prior device described did not make provision for deactivating the motor control circuitry used for thread tapping during the periods when the machine tool was being utilized for other machining functions than thread tapping. Because thread tapping may be performed relatively infrequently compared to the regular use of the machine tool for drilling, milling and other machining operations, an attachment which confined the tool to thread tapping operations only would not be practical for some installations.

It may also be noted that the prior device required an affirmative upward movement of the handle to initiate reversal of the thread tap. Mere removal of down pressure from the handle alone would not do so. However, for reasons of safety, it would be preferable to have a "Dead Man" mode of operation whereby if the operator should release his down pressure on the handle during drilling for some reason, for example sudden illness or inattention, rotation of the moving machinery would immediately cease.

SUMMARY OF THE INVENTION

A control assembly according to the present invention, can be easily installed on a drill press or vertical milling machine by simply removing the existing hub unit and replacing it with a new hub unit incorporating the control assembly of the present invention and by making appropriate electrical connections. The present control assembly incorporates the switches responsive to operation of the control handle, within the unit attached to the quill control shaft and thus does not require mounting of those switches on the exterior of the frame along with associated linkages and the like.

In addition, the control assembly of the invention, which includes an inner sleeve secured to the control shaft and an outer sleeve secured to the handle, includes provision for locking the two sleeves rigidly together to deactivate the thread tapping control circuitry when the machine is being utilized for purposes other than thread tapping.

In more detail, a control assembly according to the preferred embodiment of the invention, includes an inner sleeve which is secured to the control shaft of the machine tool. An outer sleeve concentrically mounted on the inner sleeve is provided wiith an operating handle. The outer sleeve is able to move a limited distance between first and second extreme conditions relative to the inner sleeve by a lost motion connection between the sleeves. A self-centering detent connected with the outer sleeve yieldably urges it continuously to a neutral position between the extreme positions. First and second microswitches are carried by one of the sleeves while the other of the sleeves is connected with first and second cams which cooperate with the first and second microswitches respectively. When the outer sleeve is moved to its first extreme position relative to the inner sleeve, the first cam closes the first microswitch which energizes the motor to drive the spindle in an appropriate direction to cause the thread tap to feed into the workpiece. When the outer sleeve is moved to its opposite extreme position, the second cam closes the second microswitch which energizes the motor to drive the spindle in a reverse direction causing the tap to be fed out from the workpiece. If, for any reason, the operator should cease to apply pressure to the handle during tapping, the self-centering detent returns the outer sleeve from its either extreme position to the neutral position thereby breaking the power connection to the motor so that the tap ceases to turn, thus providing a "Dead Man" safety feature.

By positioning the microswitches on the sleeves rather than on the frame, it is possible to provide a combined handle and control assembly unit which may be installed by simple replacement of the existing hub and handle assembly on the end of the quill control shaft and making the appropriate electrical connections.

During periods when it is desired to use the drill press or vertical miller for other functions than thread tapping, the inner and outer sleeves may be fixedly locked together by the action of a radially slidable pin. When the sleeves are locked together, the handle is directly coupled to the quill control shaft so that the machine tool functions in its other modes of operation as it would exactly as if the thread tapping control assembly had never been installed.

In a further aspect of the invention, a third microswitch is included in the system to provide for automatic reversal of motor operation after the workpiece has been tapped to a preselected depth. The usual drill press or vertical miller includes a threaded gauge rod connected at one end with the quill and provided with a selectively adjustable stop member. The third microswitch is attached to the frame in a position in which it will be contacted by the stop member on the gauge rod at the point at which the tap has entered the workpiece to the required depth, to cause the motor to be energized in the reverse direction to unthread the tap from the workpiece.

The foregoing, and other advantages and features of the invention, are described more fully in the following detailed description.

BRIEF DESCRIPTION OF THE DRAWINGS

A control assembly according to the preferred embodiment of the invention is illustrated in the accompanying drawings in which:

FIG. 5 is a cross-sectional side view of the hub portion shown in FIG. 3 taken along the lines 5—5 therein;

FIG. 6 is a cross-sectional view of the hub portion shown in FIG. 5 taken along the lines 6—6 therein;

FIG. 7 is a fragmentary view on an enlarged scale of a depth microswitch utilized to terminate thread tapping after a hole has been tapped to a predetermined depth; and FIG. 8 is a top view of the microswitch shown in FIG. 7.

DETAILED DESCRIPTION

Figure 1:
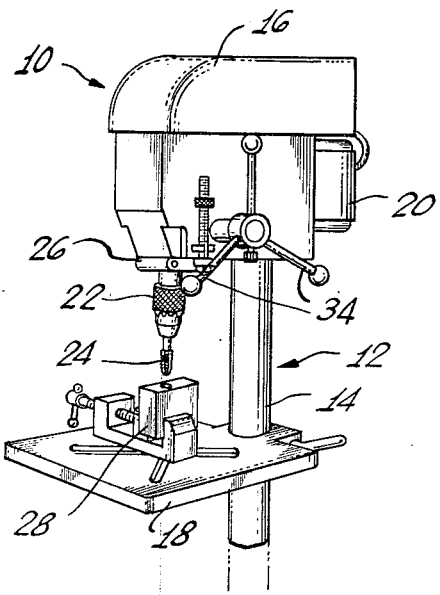
FIG. 1 is a perspective view of a portion of a drill press to which has been attached a control assembly constructed according to the preferred embodiment of the invention.

A control assembly according to the preferred embodiment of the invention is shown (FIG. 1) attached to a machine tool 10 comprising a conventional drill press.

The machine tool has a frame 12 which includes a column 14 having a housing 16 mounted at its upper end and a movable work table 18 adjustably mounted on the column. The housing 16 supports a reversible electric motor 20 which drivingly rotates a spindle 22 through a conventional drive train (not shown) in normal and reverse directions. Different tools including a thread tap 24 can be attached to the spindle. The spindle is rotatably supported by a quill 26 which is mounted movably in the frame for up and down travel to advance the thread tap 24 into and out of an underlying workpiece 28 releasably secured to the work table 18, to tap a thread in an already bored, opening 30 in the workpiece. The quill is moved up and down relative to the housing 16 by turning a quill pinion shaft 32 extending transversely and horizontally through the housing which engages the quill by a rack and pinion drive (not shown). At its free end, the quill pinion shaft is provided with a hub from which extend handles 34 which an operator may grasp by hand.

The drill press thus far described is entirely conventional. In addition, the control assembly of the invention may be used with other machine tools having corresponding working parts to those just described, such as, for example, a vertical milling machine (including a Bridgeport milling machine).

A control assembly according to the present invention is designed as a hub unit which may be mounted on the end of the quill pinion shaft of the machine tool as a replacement for the original equipment, solid hub, and incorporates switching circuitry to automatically control the direction of rotation of the thread tap once tapping commences in response to the direction in which the operator applies hand pressure to the handles 34.

Figure 3:
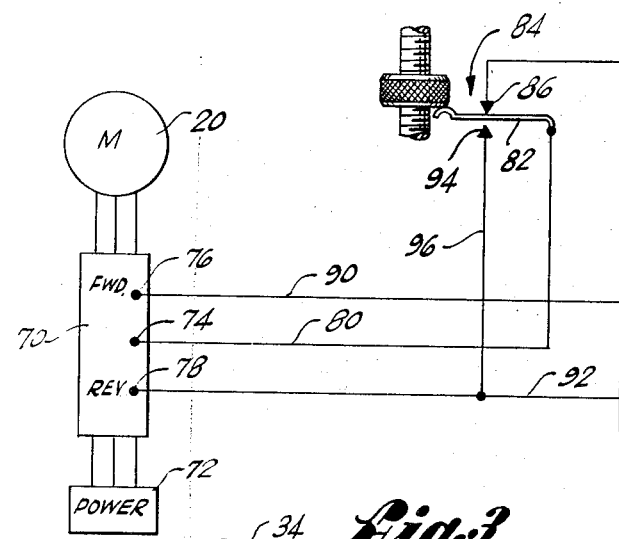
FIG. 3 is a cross-sectional end view of a hub portion of the control assembly shown in FIG. 1 with the parts of the hub portion shown in a neutral position thereof.

More particularly, the control assembly of the invention includes a hub unit (FIGS. 3 and 5) comprising a tubular inner sleeve 36 which is slid onto the free end of the quill pinion shaft 32 and fixedly secured thereto by a set screw 38 (FIG. 5), and an annular outer sleeve 40 concentrically mounted on the inner sleeve. The handles 34 from the original equipment hub on the machine tool are unscrewed from that hub once it has been removed from the quill pinion shaft, and are mounted in equally spaced threaded bores 42 spaced about the peripheral edge of the outer sleeve 40. The inner and outer sleeves 36 and 40 and the quill pinion shaft 32 are connected together by a pin 44 extending diametrally through them. The pin 44 is of uniform diameter along its length, except in certain undercut regions to be described, and is slidably received within passages of corresponding diameter in the sleeves and the quill shaft.

When the machine tool is to be used for thread tapping, the pin 44 is in an operating position (FIG. 3) in which two axially spaced, circumferentially extending undercut regions 46 and 48 of the pin 44 are aligned with two passages 50 and 52, in the inner sleeve respectively, through which the pin passes. The spacing between the undercut regions 46 and 48 and the adjacent edges of the passages 50 and 52 in the inner sleeve 36 provides a lost motion connection which enables the outer sleeve to undergo limited rotational motion relative to the inner sleeve before the sleeves become drivingly engaged together by the pin.

The limited lost motion travel of the outer sleeve relative to the inner sleeve extends between a first extreme position (shown in FIG. 4) in which the lower side of the undercut region 46 is in contact with the lower edge of the passage 50, and a second extreme position (not shown) in which the underside of the undercut region 48 is in contact with the lower edge of the passage 52. Both the undercut regions are given a conoidal taper so that they make flat abutting contact with the adjacent edges of the openings in the extreme positions, to prevent wear. Midway between the first and second extreme positions, the pin 44 and outer sleeve 40 occupy a neutral position (shown in FIG. 3) in which each of the undercut regions is spaced midway out of contact with the edges of the passages 50 and 52 in the inner sleeve.

The outer sleeve is continuously biased towards the neutral position relative to the inner sleeve by a ball detent 54 (FIG. 5) which extends partially into a conical opening 56 in the inner sleeve 36. In the neutral position, the opening 56 is aligned with the ball 54 which is biased into the opening by a spring 58. The sleeves tend to turn together until the inner sleeve encounters a resistance to its motion sufficient that continued force applied to the handles causes the detent 54 to unseat. Thereafter the outer sleeve can move to one or other of its extreme positions dependent on the direction of force applied to the handle.

The lost motion travel is utilized to effect opening and closing of two microswitches carried by the outer sleeve 40, an upper microswitch 60 and a lower microswitch 62. The microswitches are provided with pivoted feeler arms 64 and 66, respectively, facing towards and parallel to the pin 44. Depression of either feeler towards its associated microswitch causes the microswitch internal contacts to close. Each microswitch feeler is spring biased in a direction away from the microswitch to open the switch contacts. As will be described hereinafter, closing of the upper microswitch applies power to the motor 20 in a direction to rotate the tap so that it advances into the workpiece while closing of the lower microswitch applies power to the thread tap in a reverse direction to unthread it from the workpiece.

To move the switch feelers 64 and 66, two flat cams 68 and 70 (FIG. 4) constituted by two axially extending shoulders extending from the forward end of the inner sleeve 36 are provided. In the neutral position of the outer sleeve (FIG. 3), the shoulders 68 and 70 underlie and overlie the free ends of the feelers 64 and 66, respectively of the microswitches 60 and 62 with both of the microswitches being in an open condition.

Figure 4:
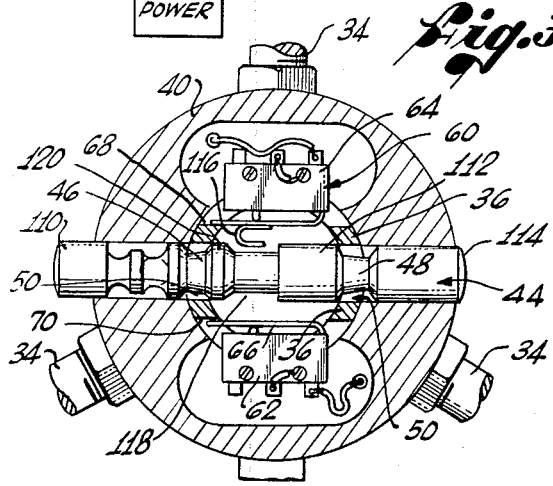
FIG. 4 is a cross-sectional view of the hub portion shown in FIG. 3 but with the parts thereof rotated to a first extreme position which they occupy when a thread tap is being advanced into a workpiece.

In operation, with the thread tap 24 initially spaced above the workpiece out of contact with it, the outer sleeve 40 will be biased to its neutral position and neither microswitch will be closed so that the thread tap is stationary. As the operator applies turning pressure to the handles 34 in a direction to move the quill downwardly, at first there will be no resistance to downward movement of the thread tap so that the sleeves will remain coupled together by the detent 54 while the quill pinion shaft 32 turns to move the quill downwardly. When the thread tap comes into contact with the opening in the workpiece, because it is oversize in relation to the opening, there is resistance to further downward movement of the tap. However, the operator continues to apply force to the handles 34 to move the quill downwardly with the result that the spring loaded detent 54 unseats and the outer sleeve moves to its first extreme position (FIG. 4). During this movement, the free end of the upper feeler 64 and the microswitch 60 move relatively closer together with the result that the switch contacts of the upper microswitch are closed completing a circuit which energizes the motor 20 in a direction to rotate the tap 24 in a forward direction. Rotation of the thread tap in the forward direction causes it to cut a thread in the opening in the workpiece, advancing itself by a threading action as rotation in the forward direction continues. During this tapping action, the operator maintains a continuous down pressure on the handles 34 to maintain the outer sleeve in its first extreme position relative to the inner sleeve.

If the operator ceases to apply down pressure to the handles, for example, due to sudden illness or inattention, the self-centering action of the ball detent 54 restores the outer sleeve to its neutral position, thereby opening the contacts of the upper microswitch 60 so that the rotating machinery comes to a stop. Thus, a control assembly according to the invention functions as a "Dead Man" safety handle to stop the machine whenever the operator removes control pressure.

When the operator wishes to terminate tapping under manual control, he applies an upward pressure to the handles 34. Because the tap is not free to move upwardly out of the workpiece which is clamped to the work table 18, the upward pressure turns the outer sleeve 40 in an opposite direction relative to the inner sleeve 36 until it reaches its second extreme position. During this motion, the lower feeler 66 becomes relatively depressed against the associated microswitch 62 which closes, thereby completing an electrical circuit to the motor 20 to energize it in a reverse direction. During the same movement the upper microswitch 60 is opened to break the forward electrical circuit to the motor. The reverse rotation, causes the tap to unthread itself out of the workpiece.

Figure 2:
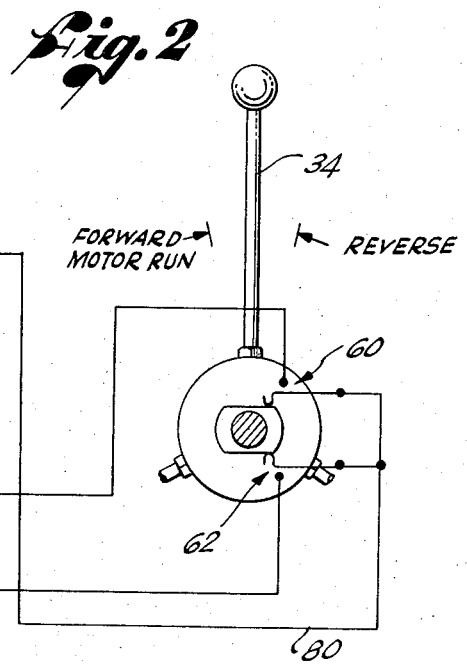
FIG. 2 is a simplified electrical circuit diagram of the control assembly shown in FIG. 1.

The electrical circuit for the control assembly (FIG. 2) includes a conventional three-phase reversing controller 70 interposed between the motor 20 and a three-phase source of power 72. The reversing controller is a conventional installation and may be, for example, a Dunco Reversing Contact, Model 275-K-XX made by Struthers-Dunn Inc. of Pitman, N.J. in conjunction with 24 volt control transformer (not shown). The reversing controller 70 includes a common terminal 74, a forward terminal 76 and a reverse terminal 78. Completion of an electrical circuit between the forward terminal 76 and the common terminal 74 causes the motor 20 to be driven in a forward direction while completion of an electrical circuit between the reverse terminal 78 and the common terminal 74 causes the motor to be energized so that it drives in a reverse direction.

The common terminal 74 is connected by a line 80 to a movable switch element 82 forming part of a third microswitch 84. The movable element 82 is resiliently biased to a position in which it is normally in contact with a first, stationary switch terminal 86 of the third microswitch. The first switch terminal 86 is connected by a line 88 to both the moving switch element of the upper and lower microswitches 60 and 62.

When the quill shaft is turned to move the tap against the workpiece thereby closing the contacts of the first microswitch 60, an electrical circuit is completed from the forward terminal 76 via a line 90 and the switch 60 to the line 88 which connects through the contacts 82 and 86 of the third microswitch 84 and the line 80 to the common terminal 74, thus energizing the motor to drive in the forward direction. If the quill shaft is subsequently turned in an opposite direction causing the contacts of the second microswitch 62 to close, an alternative electrical circuit is completed from the reverse terminal 78 through another line 92 via the switch 62 to the line 88 which connects through the contacts 82 and 86 of the third microswitch 84 to the line 80 to the common terminal 74, thus energizing the motor in the reverse direction.

When the movable element 82 of the third microswitch 84 is depressed while the motor is operating in a forward condition, as will be described hereinafter, the circuit to the forward terminal 76 is broken. Instead the movable element 82 comes into contact with a second terminal 94 of the third microswitch which completes a circuit through a line 96 to the previously mentioned line 92 connected to the reverse terminal 78, thereby reversing the direction of motor rotation.

The third microswitch 84 is provided for the purpose of automatic depth control during tapping operations. As may be seen in FIG. 7, the quill 26 of the drill press is provided with a gauge rod 100 which extends upwardly in parallel relation to adjacent portions of the housing 16. The housing 16 includes an integral, sidewardly extending, U-shaped projection 102 through which the gauge rod passes. A threaded stop member 104 is threaded axially along the gauge rod to a preset spacing from the projection 102. The third microswitch 84 is mounted on a U-shaped magnet 106 which straddles the projection 102 and passes around the gauge rod 100. The magnet is magnetized in a vertical direction so that it firmly grips the upper surface of the projection 102. A feeler 108 associated with the microswitch projects into underlying relation to the path of travel of the stop member 104, so that after the gauge rod has moved down through a predetermined distance, the stop 104 contacts the feeler and moves the movable element 82 of the third microswitch (FIG. 2) into contact with its second stationary contact 94, thereby automatically reversing the direction of motor rotation so that the tap commences the unthread from the workpiece.

On occasions when the machine tool is to be used for functions other than thread tapping, it is necessary to disable the control circuitry just described. The previously mentioned pin 44 (FIG. 3) has one of its extremities 110 projecting outwardly of the outer sleeve when the pin is in the operating position. To move the pin to a disabling, or locked, position, pressure is applied to the end 110 to move the pin inwardly. One effect of so doing is to move the undercut region 48 out of the opening 50 in the inner sleeve and replace it by a full diameter portion 112 of the pin. The portion 112 is the same diameter as the opening 50 and extends into adjacent aligned portions of the passage through the outer sleeve, thereby locking the inner and outer sleeves rigidly together. With the pin in the locked position, turning force applied to the handle turns both sleeves and the quill pinion shaft together as a rigid unit just as if the original hub unit had never been replaced with the hub unit of the invention. After the pin has been slid to the locked position, its opposite end 114 will be projected beyond the sleeve 40. In order to return the control assembly to the operating condition, it is only necessary to press on the opposite end of the pin. It is also possible to drill with pin 44 in the operating possition and to obtain the dead man safety advantages during drilling.

To provide forward power to the spindle when the pin 44 is in the locked position, a U-shaped projection 116 (FIGS. 3 and 4) is provided on the underside of the feeler arm 64 of the upper microswitch 60. When the pin 44 is in the operating position, the projection 116 rests within a third undercut region 118 in the pin. While in the third undercut region 118, the projection 116 is out of contact with the pin so that the operation of the feeler arm is unaffected by its presence, and occurs in the manner previously described. However, the sliding movement of the pin to the locked or disabling position moves the undercut region 118 out of alignment with the projection 116. The projection 116 is then moved towards the microswitch 60 by another, full diameter region 120 of the pin. Such microswitch 60 causes the feeler arm 60 to close the contacts of the microswitch 60 so that power is continuously applied to the motor 20 to drive it in the forward direction.

To hold the pin 44 in each of its locked and operating positions, it is provided with two circumferential grooves 122 and 124 (FIG. 6) adjacent its end 110. The grooves 122 and 124 partially receive another spring-loaded ball detent 126 (FIG. 6) acted on by a spring 128 mounted within a closed bore. The spring-loaded detent insures that the pin 44 is held positively in each of its selected positions.

To avoid winding the electrical lines connected to the microswitches around the quill pinion shaft as it is rotated, inner and outer, spaced, concentric slip rings 130 and 132 (FIG. 6) are provided. The slip rings 132 and 130 are connected by the lines previously described 90 and 92 to the forward and reverse terminals 76 and 78 of the motor controller. The slip rings are mounted on an insulating annular disc 134 supported within a toroidal slip ring holder 136 extending slidably around the inner sleeve 36. The slip ring holder 136 is mounted between a shoulder 138 on the outer sleeve and a parallel, facing shoulder 140 on the inner sleeve, thereby maintaining the axial location of the slip ring holder.

The slip rings 130 and 132 are slidingly contacted by spring-loaded electrical brushes 140 and 142 mounted in the outer sleeve extending axially into contact with the slip rings. The sliding brushes 142 and 140 are connected to the stationary contacts of the microswitches 60 and 62, respectively. The movable switch elements of the microswitches 60 and 62 are grounded to the machine frame which is in turn electrically connected to the first stationary contact 86 of the third microswitch, the grounded portions of the frame thereby constituting the line 88.

Using the slip rings enables all the electrical connections to the microswitches to be positioned within the hub so that it can be mounted as a unit on the quill pinion shaft, rather than having an arrangement where switch structure has to be mounted externally on the frame to avoid problems of wrapping the electrical cables around the quill pinion shaft.

The lines 90 and 92 form part of a cable 150 (FIG. 1) which is attached to the housing 16 and extends to the motor controller 70 which is secured to the motor 20. The cable 150, at its end adjacent the hub, enters a section of stiff armored sheathing 152 (FIG. 6) which extends upwardly into an opening 154 in the slip ring holder 136. The sheath also passes through a hooked wire 156 having a grommet 158 mounted in its free end to encircle the sheath 152. At its opposite end the wire 156 is fixedly secured to the housing 16 by a screw or other suitable connector. The rigidly of the sheath is such as to prevent the slip ring holder 136 from rotating as the quill pinion shaft and the inner and outer sleeves are turned.

To prevent access of dust into the interior of the unit, a releasable, dished circular cover 160 (FIG. 5) is secured over the open end of the outer sleeve.

When tapping into relatively weak material, such as, for example, sheet plastic, it is necessary to reduce the detent force that must be overcome before the outer sleeve can move relative to the inner sleeve. For this purpose, the spring 58 tensioning the ball detent 54, is mounted within a hollow cap 170 threadedly received within a bore in the outer sleeve 40. By threading the cap 170 outwardly, the spring tension can be reduced so that the force necessary to unseat the detent and free the outer sleeve for motion can be reduced to a lower level when weaker materials are being tapped.

Although the invention has been described with reference to one preferred embodiment, it will be understood by those skilled in the art that many deletions, additions, modifications and other changes may be made which will fall within the spirit of this invention.

I claim:

1. A control assembly for control of thread tapping operations for attachment to a machine tool, the machine tool having a frame, a quill mounted for linear motion relative to the frame, a spindle rotatably mounted in the quill for releasably supporting a thread tap, a reversible motor for rotating the spindle in opposite directions, and a control shaft rotatably mounted in the frame in driving engagement with the quill for moving the spindle towards and away from a workpiece; the control assembly including:
   an inner sleeve adapted to be secured to the control shaft for rotation therewith;
   an outer sleeve concentrically mounted on the inner sleeve, said outer sleeve provided with a handle;
   a lost motion connection connecting said sleeves for rotation together while enabling said outer sleeve to move through a limited range of rotation relative to said inner sleeve between first and second extreme positions via an intermediate, neutral position,
   centering means connected with said sleeves for yieldably urging said outer sleeve continuously to the neutral position;
   switch means carried by one of said sleeves for controlling the direction of rotation of the motor;
   means for connecting said switch means to the reversible motor; and
   actuating means carried by the other of said sleeves for operating said switch means in response to the relative positioning of said sleeves, said actuating means when said outer sleeve is in the first extreme position operating said switch means to energize the motor to drive the spindle in an in-feed direction in which the thread tap advances into the workpiece, said actuating means when said outer sleeve is in the second extreme position operating said switch means to energize the motor to drive the spindle in an opposite, out-feed direction in which the thread tap reverses out of the workpiece.

2. A control assembly as defined in claim 1 wherein said actuating means when said outer sleeve is in the neutral position thereof operates said switch means to deenergize the motor to cease rotating the spindle in either direction.

3. A control assembly as defined in claim 1 wherein said means for connecting said switch means to the motor includes:
   at least one stationary circular slip-ring extending concentrically around and spaced from said sleeves, said slip-ring being connected to the reversible motor; and
   at least one brush connected with said switch means in wiping contact with said slip-ring.

4. A control assembly as defined in claim 1 further including:
   disabling means associated with said lost motion connection for selectively locking said sleeves fixedly together in the neutral position without lost motion between them.

5. A control assembly as defined in claim 1 wherein said outer sleeve is moved to said first extreme position when the tap is in contact with the workpiece and pressure is applied to said handle in a direction to move the tap inwardly of the workpiece, said outer sleeve subsequently being moved to said second extreme position when pressure is applied to said handle in an opposite direction to move the tap back out of the workpiece.

6. A control assembly as defined in claim 1 further including:
   means connected with the motor responsive to the depth to which the tap has entered the workpiece for automatically changing the direction of rotation of the spindle to the out-feed discretion when the top has entered the workpiece to a preselected depth.

7. A control assembly for control of thread tapping operations for attachment to a machine tool having a frame, a quill mounted for linear motion relative to the frame, a spindle rotatably mounted in the quill for releasably supporting a thread tap, a reversible motor for rotating the spindle in opposite directions, and a control shaft rotatably mounted in the frame in driving engagement with the quill for moving the spindle towards and away from a workpiece; the control assembly including:
   an inner sleeve adapted to be secure to the control shaft for rotation therewith;
   an outer sleeve concentrically mounted on the inner sleeve, said outer sleeve provided with a handle;
   a lost motion connection connecting said sleeves for rotation together while enabling said outer sleeve to move through a limited range of rotation relative to said inner sleeve between first and second extreme positions via an intermediate, neutral position,
   centering means connected with said outer sleeve for yieldably urging said outer sleeve continuously to the neutral position;

first and second microswitches carried by one of said sleeves, said microswitches connected with the reversible motor; and first and second cams connected with the other of said sleeves, said first and second cams closing said first and second microswitches one at a time when said outer sleeve occupies said first and second extreme positions, respectively; said first microswitch when closed energizing said motor to drive said spindle in a in-feed direction causing the thread tap to feed into the workpiece, said second microswitch when closed energizing said motor to drive said spindle in a reverse, out-feed direction causing the thread tap to feed out from the workpiece.

8. A control assembly as defined in claim 7 further including:

disabling means associated with said lost motion connection for selectively locking said sleeves fixedly together in the neutral position without lost motion between them.

9. A control assembly as defined in claim 8 further including:

means for providing a continuous power connection to the motor to drive the spindle in the in-feed direction of rotation thereof while said disabling means is fixedly locking said sleeves together.

10. A control assembly as defined in claim 7 wherein said lost motion connection includes:

a pin connected with one of said sleeves;

an opening in the other of said sleeves receiving said pin, said opening having closed opposite ends against which said pin abuts in said first and second extreme positions, said pin in the neutral position being spaced from the opposite ends of said opening.

11. A control assembly as defined in claim 10 wherein said pin is movably mounted on said one sleeve for limited movement thereon between free and locked positions, and wherein at least one of said pin and said opening includes:

inter-engaging portions, said inter-engaging portions preventing movement of said pin from the neutral position relative to said opening when said pin is in the locked position thereof, said pin being movable across said opening between the opposite ends thereof when said pin is in the free position thereof.

12. A control assembly as defined in claim 11 further including:

means connected with one of said sleeves responsive to the position of said pin in the free and locked positions thereof for providing a continuous power connection to the motor to rotate the spindle in the in-feed direction thereof while said pin is in said locked position.

13. A control assembly as defined in claim 11 wherein said pin is of uniform cross-section along a major portion of its length and extends slidably through aligned passages of corresponding cross-section extending radially through said inner and outer sleeves and at least a portion of the control shaft to lock said sleeves and said shaft fixedly together in the locked position of said pin, said pin further including:

an undercut region of reduced cross-sectional dimension, said pin being slidable in said passages to position said pin in the free position in which said undercut region is aligned with said passage in said outer sleeve, said outer passage in said outer sleeve constituting said opening and being spaced sufficiently from said undercut region of said pin to provide the lost motion connection.

14. A control assembly as defined in claim 13 further including:

a second undercut region on said pin;

said first microswitch including a feeler received with said second undercut region when said pin is in the free position thereof, said pin in said locked position moving said feeler to close said first microswitch thereby energizing the motor to drive the spindle in the in-feed direction.

15. A control assembly as defined in claim 7 further including:

first and second switch output connections on said first and second microswitches, respectively, each said microswitch in the closed condition thereof connecting power to the associated one of said switch output connections;

stationary, circular, first and second slip-rings encircling said inner sleeve, said slip-rings being connected with the motor; and first and second brushes connected with said first and second switch output connections for providing continuous sliding contact with said first and second slip-rings respectively during rotation of the control shaft.

16. A control assembly as defined in claim 7 wherein said centering means includes:

a radial bore in said outer sleeve intersected by said inner sleeve;

a detent movably mounted in said radial bore;

a spring mounted within said bore for urging said detent continuously against said inner sleeve; and a recess in said inner sleeve into which said detent extends partially, said recess being aligned with said bore when said outer sleeve is in the neutral position, said detent and said recess being configured to exert a camming action urging said outer sleeve to the neutral position relative to the inner sleeve.

17. A control assembly as defined in claim 16 further including:

means for varying the compression of said spring to selectively vary the torque necessary to overcome said detent and free said inner an outer sleeve for relative motion.

18. A control assembly as defined in claim 7 wherein said first and second cams comprise axially extending shoulders fixedly secured to said inner sleeve, said shoulders being parallel to a diameter of the control shaft spaced at equal radial distances on either side of said diameter, relative rotation of said inner and outer sleeves causing portions of one or other at a time of said shoulders to move relatively closer to the adjacent one of said microswitches to close the same.

19. A control assembly as defined in claim 7 for use with a machine tool wherein the machine tool further includes a depth control rod carried by the quill, the depth control rod being provided with a movable stop member to control the depth to which the tap enters the workpiece; the control assembly further including:

a third microswitch adapted for connection to the frame, said third microswitch being contacted by the stop member and closed thereby when the tap has moved a preselected depth into the workpiece, said third microswitch when closed energizing said motor to rotate the spindle in the out-feed direction thereby feeding the tap out of the workpiece.

20. A control assembly as defined in claim 19 further including a magnetic bracket connected to said third microswitch for attaching said third microswitch to said frame.

* * * * *